No. 851,119. PATENTED APR. 23, 1907.
C. CONTAL.
CHAIN TENSION AND BRAKE DEVICE.
APPLICATION FILED MAR. 27, 1906.
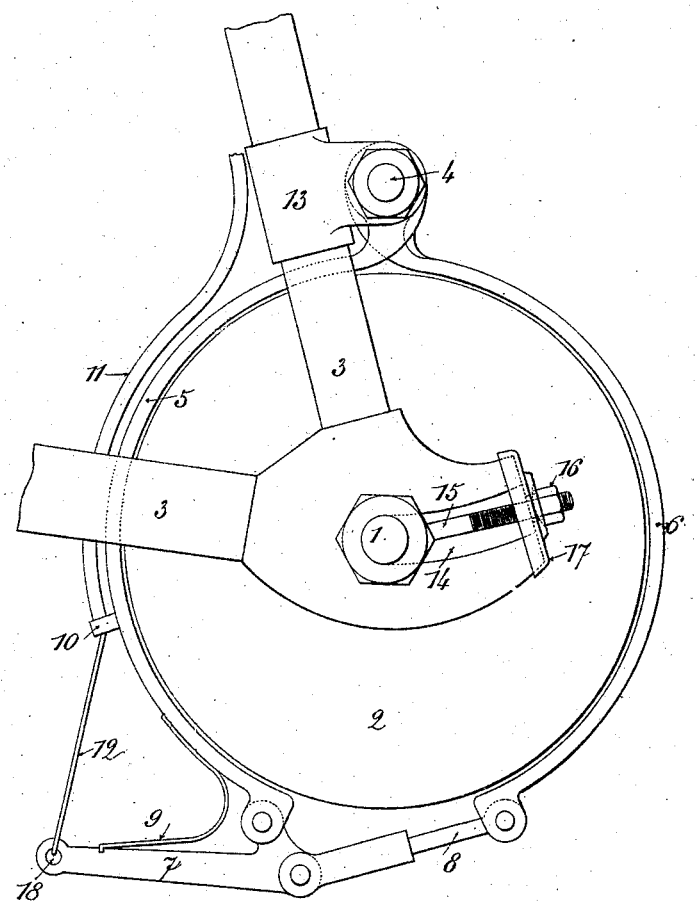
Witnesses
Inventor
Camille Contal
By H. B. Willson & Co.
Attorneys.

UNITED STATES PATENT OFFICE.

CAMILLE CONTAL, OF LEVALLOIS-PERRET, FRANCE.

CHAIN-TENSION AND BRAKE DEVICE.

No. 851,119.	Specification of Letters Patent.	Patented April 23, 1907.

Application filed March 27, 1906. Serial No. 308,294.

*To all whom it may concern:*

Be it known that I, CAMILLE CONTAL, a citizen of the Republic of France, residing at Levallois-Perret, 1 Rue Gravel, in the Republic of France, engineer, have invented certain new and useful Improvements in Chain-Tension and Brake Devices for Cycles and Motor-Cars, of which the following is a specification.

My invention relates to improvements in chain tension and brake devices for cycles and motor-cars, and the object of the invention is to provide a simple and efficient device of this character which will admit of easily setting the brake once for all. In this improved device, the rear wheel, which is provided with a sprocket wheel and a brake drum, is loosely mounted on an axle which is secured to the rear fork of the bicycle, or to the chassis of the motor-car, in such a manner as to enable it to be brought nearer to or moved away from the driving wheel through the instrumentality of curvilinear slide-ways provided in the fork or in the chassis; on the other hand, the brake jaws or bands are mounted on a stud fixedly secured to the said fork or the said chassis. In certain arrangements of this kind now in use, the slide-ways which serve to regulate the tension of the chain are rectilinear and directed in such a manner that the distance between the axis of the wheel and the fixed point of the brake varies when the position of the said axis is changed, and that, in consequence, the position of the brake jaws or bands and that of their controlling mechanism, with respect to the brake drum, undergo changes which are not in keeping with the proper operation of the said members. This drawback is avoided by my invention, because the slide-ways and members which serve to regulate the tension of the chain are so arranged that the distance between the axis of the wheel and the fixed point of the brake always remains the same.

One embodiment of my invention is shown, by way of example, in the accompanying drawing and in its application to the frame of a bicycle.

In the said drawing, 1 designates the axle around which the rear wheel revolves, the said wheel being provided with a sprocket wheel and its brake drum 2, the rear wheel and the sprocket wheel not being shown in the drawing. The said axle 1 is secured to the frame 3 of the bicycle, on which is also secured a pivot 4, carrying the brake jaws 5, 6, which extend around the brake drum 2. To the jaw 5 is pivoted a bent lever 7, which is connected, in a well known manner, with the other jaw by a link 8, and subjected to the action of a spring 9; the jaw 5 also carries a lug 10, on which bears the flexible tube 11 of a Bowden cable 12, which consists in a flexible tube incompressible in the direction of its length with the cable sliding through said tube attached to the lever 7. When the said cable is pulled, the lever 7 causes the jaws to move towards each other and to clamp the brake drum 2 between them, while the spring 9 causes the said jaws to move away from each other again when the cable 12 is no longer pulled.

The pivot 4 is permanently secured to the frame 3 in any suitable manner, as for instance by means of a ring 13 brazed onto the said frame. But the axle 1 is mounted in the slide-ways 14, provided in the frame 3, in such a manner as to be enabled to move either towards or away from the driving wheel; its position is regulated by means of bolts 15, jointed on the same, and of nuts 16, which bear on yokes 17, in a well known manner.

The curve of the slide-ways 14 is concentric with the pivot 4, so that the distance between the said pivot and the axle 1 remains always the same whatever may be the position of the latter. Hence, the relative position of the jaws 5, 6 with respect to the brake drum 2 also remains invariably the same and the operation of the braking members remains absolutely independent of the regulation of the tension of the chain. Furthermore, the pulling member 12, which acts at 18 on the brake lever 7, bears, through the medium of the flexible tube 11, on the lug 10; as the bearing and pulling points 10 and 18 are both located on a portion of the brake which moves bodily around the fixed point 4 when the tension of the chain is being regulated, it follows that their relative position does not vary during that operation, and that the braking mechanism as well as the cable which controls the same are thus enabled to operate under conditions which are always the same and always independent of the position of the axle 1.

It is to be understood that the invention is not limited either to the braking mechanism shown or to the kind of pulling member known under the name of the Bowden cable.

I claim—

1. The chain tension and braking device for cycles and motor-cars, comprising a brake drum, a jaw brake engaging the said drum, a stud on which the said jaws are enabled to swing and which is adapted to be permanently secured to the frame of the cycle or to the chassis of the motor-car, and a plate adapted to be secured to the said frame and having a curved slide-way the curve of which is concentric with the said stud on which the jaws swing, the said slide-way being designed to receive the spindle of the said drum.

2. A chain tension and braking device for cycles and motor-cars, comprising a brake drum, a brake having jaws engaging the said drum, and a system of levers adapted to move the said jaws towards or away from each other, a stud on which the jaws are enabled to swing and which is adapted to be fixedly secured to the frame of the cycle or to the chassis of the motor-car, a plate adapted to be fixedly secured to the said frame or chassis and having a curved slide-way the curve of which is concentric with the said stud on which the said jaws are enabled to swing and which is adapted to receive the spindle of the said drum, a flexible tube the length of which remains invariable and of which one end bears against one of the brake jaws, and an operating flexible cable passing freely through the said tube and which is connected with the said system of brake levers.

In testimony that I claim the foregoing as my invention, I have signed my name in presence of two subscribing witnesses.

CAMILLE CONTAL.

Witnesses:
 HANSON C. COXE,
 MAURICE ROUX.